United States Patent
Llinas et al.

(10) Patent No.: US 7,812,103 B2
(45) Date of Patent: Oct. 12, 2010

(54) METHOD FOR REDUCING SHEETING AND AGGLOMERATES DURING OLEFIN POLYMERISATION

(75) Inventors: Jean-Richard Llinas, Marseilles (FR); Jean-Loic Selo, Sausset les Pins (FR)

(73) Assignee: Ineos Europe Limited, Hampshire (GB)

( * ) Notice: Subject to any disclaimer, the term of this patent is extended or adjusted under 35 U.S.C. 154(b) by 236 days.

(21) Appl. No.: 11/014,901

(22) Filed: Dec. 20, 2004

(65) Prior Publication Data

US 2005/0165179 A1     Jul. 28, 2005

(30) Foreign Application Priority Data

Mar. 6, 2000    (EP) .................................. 00430010

(51) Int. Cl.
*C08F 2/00*   (2006.01)
*C08F 210/00* (2006.01)

(52) U.S. Cl. .......................... 526/73; 526/74; 526/348

(58) Field of Classification Search ................. 526/901, 526/73, 74, 348
See application file for complete search history.

(56) References Cited

FOREIGN PATENT DOCUMENTS

| EP | 0 848 021 A2 | 6/1998 |
| EP | 1 016 455 A2 | 7/2000 |
| WO | WO 96/39450 | 12/1996 |
| WO | WO 99/02573 | * 1/1999 |
| WO | WO 99/03901 | 1/1999 |
| WO | WO 9902573 | 1/1999 |

* cited by examiner

*Primary Examiner*—William K Cheung
(74) *Attorney, Agent, or Firm*—Nixon & Vanderhye

(57) ABSTRACT

The present invention relates to a method for reducing/suppressing sheeting or agglomerates during polymerization of olefins, especially during the fluidized bed gas phase polymerization of olefins. In particular, the present invention relates to a method for reducing/suppressing sheeting or agglomerates during the product grade transition and/or catalyst transitions occurring polymerization of olefins.

4 Claims, 4 Drawing Sheets

METHOD FOR REDUCING SHEETING AND AGGLOMERATES DURING OLEFIN POLYMERISATION

BACKGROUND OF THE INVENTION

The present invention relates to a method for reducing/suppressing sheeting or agglomerates during polymerisation of olefins, especially during the fluidised bed gas phase polymerisation of olefins. In particular, the present invention relates to a method for reducing/suppressing sheeting or agglomerates during the product grade transition and/or catalyst transitions occurring during polymerisation of olefins.

Processes for the co-polymerisation of olefins in the gas phase are well known in the art. Such processes can be conducted for example by introducing the gaseous monomer and comonomer into a stirred and/or gas fluidised bed comprising polyolefin and a catalyst for the polymerisation.

In the gas fluidised bed polymerisation of olefins, the polymerisation is conducted in a fluidised bed reactor wherein a bed of polymer particles is maintained in a fluidised state by means of an ascending gas stream comprising the gaseous reaction monomer. The start-up of such a polymerisation generally employs a bed of polymer particles similar to the polymer which it is desired to manufacture. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid. The fluidised bed consists in a bed of growing polymer particles. This bed is maintained in a fluidised condition by the continuous upward flow from the base of the reactor of a fluidising gas.

The polymerisation of olefins is an exothermic reaction and it is therefore necessary to provide means to cool the bed to remove the heat of polymerisation. In the absence of such cooling the bed would increase in temperature and, for example, the catalyst becomes inactive or the bed commences to fuse. In the fluidised bed polymerisation of olefins, the preferred method for removing the heat of polymerisation is by supplying to the polymerisation reactor a gas, the fluidising gas, which is at a temperature lower than the desired polymerisation temperature, passing the gas through the fluidised bed to conduct away the heat of polymerisation, removing the gas from the reactor and cooling it by passage through an external heat exchanger, and recycling it to the bed. The temperature of the recycle gas can be adjusted in the heat exchanger to maintain the fluidised bed at the desired polymerisation temperature. In this method of polymerising alpha olefins, the recycle gas generally comprises the monomer and comonomer olefins, optionally together with, for example, an inert diluent gas such as nitrogen or a gaseous chain transfer agent such as hydrogen. Thus, the recycle gas serves to supply the monomer to the bed, to fluidise the bed, and to maintain the bed at the desired temperature. Monomers consumed by the polymerisation reaction are normally replaced by adding make up gas or liquid to the polymerisation zone or reaction loop.

A gas fluidised bed polymerisation reactor is typically controlled to achieve a desired melt index and density for the polymer at an optimum production. Conditions within the polymerisation reactor have to be carefully controlled to reduce the risk of agglomerate and/or sheet formation which may ultimately lead to bed instabilities and a need to terminate the reaction and shut down the reactor. This is the reason why commercial scale reactors are designed to operate well within proven stable operating zones and why the reactors are used in a carefully circumscribed fashion.

Even within the constraints of conventional, safe operation, control is complex adding further difficulty and uncertainty if one wishes to find new and improved operating conditions.

There is no generally accepted view as to what causes agglomerates or sheeting. Agglomerates or sheets can, for example, form when the polymerisation temperature is too close to the polymer sintering temperature or when the polymer particles become excessively sticky. Highly active fine particles can, for example, concentrate in the upper elevations of the polymerisation zone, towards the top of the fluidised bed and in the powder disengagement zone above the bed thus leading to local hot spots and potential agglomeration and/or sheeting.

SUMMARY OF THE INVENTION

According to the present invention a thorough understanding of sheeting and agglomeration mechanisms has allowed us to develop product specific operating windows where sheeting or agglomeration do not occur. This is illustrated with comparative examples, that the newly developed operating windows are unusual and that the "man skilled in the art" would previously have avoided such operation for fear of encountering the very operating problems that the technique overcomes.

An embodiment of the present invention finds its source in the study of the properties of reacting polymer particles. It has been found that sheeting or agglomeration do not occur when instantaneous particle properties (mechanical, physical, dielectric . . . ) are maintained in a bounded window.

Industrial operation usually requires the production of different grades. Product transition usually corresponds to a variation in particle properties. It is an embodiment of the present invention to propose a procedure to limit the change of critical particle properties during grade transitions. This is performed by continuously changing operating conditions such that particle properties remain in a bounded window during grade transition.

Agglomerates or sheeting are responsible for costly production losses, unreliable operation, strong limitations on plant performance and considerable damage to the global polyolefin businesses.

The present invention allows us to increase plant capacity by up to 50%. for certain grades when the limitation is sheeting or agglomerates.

DETAILED DESCRIPTION OF THE INVENTION

Figure 1:
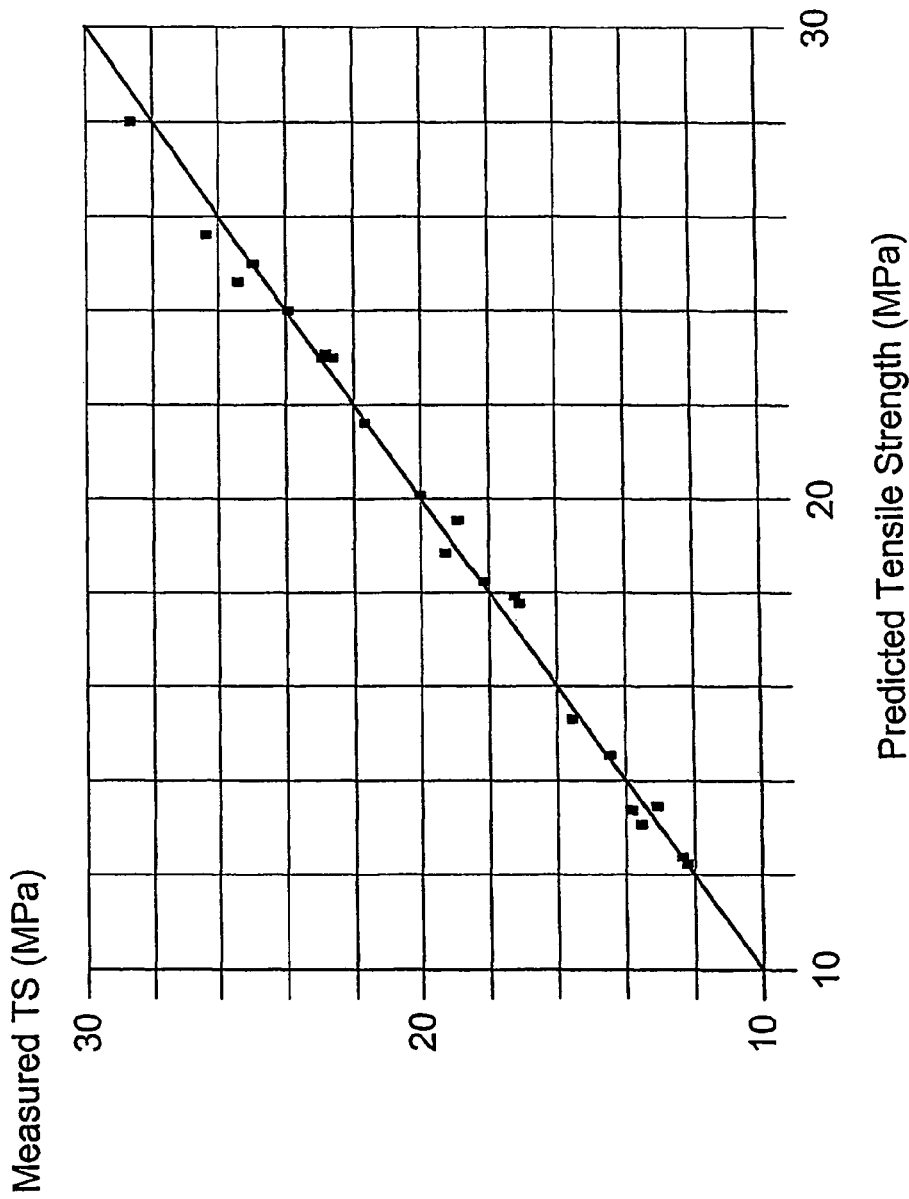
FIG. 1 is a graph comparing predicted tensile strength with measured tensile strength of RIGIDEX™ type products.

The shape of agglomerates or sheeting varies widely in size and aspect but they are usually similar in most respects. One of the most probable cause of agglomeration or sheeting (when operating far from powder sintering temperature) is the accumulation of powder at the reactor walls. We believe that the layer formed at the wall can be as thin as a few micrometers and up to several centimeters. The corresponding sheet or agglomerates have comparable thickness. The length of agglomerates can vary between a few centimeters and several meters.

A visual inspection at the outlet of the reactor can be used in order to monitor the presence of sheets or agglomerates. Temperature probes can also monitor the formation of the sheets or agglomerates. The probes can be anywhere between the insulation of the reactor (when used) to the centre of the reactor. The analysis of temperature probes is believed to be an excellent indication of the formation of sheets or agglomerates. A surprising lowering of the temperature at the wall indicates that particles adhere, causing a probable insulating effect from the bulk temperature. Deviations of a few degrees up to more than 20° C. (sometimes 35° C.) have been commonly observed. When skin temperatures start to rise, it indicates the presence of a reacting layer of powder at the wall. The corresponding zone being of limited heat transfer, such cases often lead to an agglomerate storm. Another very advantageous monitoring tool consists in optical fibres located on the surface of the reactor, examples thereof can be found in French patent application n°0007196 filed on 6 Jun. 2000 by BP Chemicals SNC.

It is also believed that the layer of powder at the wall (fused or not) may be able to fall into the reactor. This is observed by a clear disruption of fluidisation patterns (pressure probes).

When sheeting or agglomeration occurs, industrial experience (and the theory) has taught us to reduce operating temperature until agglomeration stops. This procedure is basic and is usually used by operators. However, it does not solve the root of the problem and agglomerates can reappear later, especially during grade transition. The low temperature operation is also detrimental regarding heat exchange limitations.

More than 20 years of publications indicate that electrostaticity in the bed is the contributing factor to agglomeration at the wall. However, an analysis of the prior art methods disclosed in the literature tend to prove that a plant control based on electrostatic measurement is not industrially satisfactory since the electrostatic measurement tool per se is influenced by too many factors which are totally not representative of fouling problems.

In this respect, the present invention indicates that the problem of agglomeration or sheeting can be solved regardless of static electricity considerations.

The production losses, down time, reactor cleaning and other problems related to sheeting or agglomeration are contributory to a high proportion of unplanned reactor downtime. Therefore, there is an on going need to provide additional methods of agglomeration/sheeting control.

Accordingly, the present invention provides a process for reducing/suppressing sheeting or agglomerates during polymerisation of olefins, especially during the fluidised bed gas phase polymerisation of olefins. In particular, the present invention relates to a method for reducing/suppressing sheeting or agglomerates during start-up, transitioning and steady state olefin polymerisation.

This paragraph summarises the approach used to define the optimum operating window for polymer particle properties according to the present invention.

The Applicants have found that numerous grade transitions and start-up procedures in industrial operation are characterised by drastic changes in instantaneous particle properties which lead to agglomerates and/or sheeting at the reactor wall.

A stochastic model of the fluidised bed based on a refined Monte-Carlo approach has been built in order to help understand potential agglomeration mechanisms.

The behaviour of a representative set of 10 million particles is simulated in order to evaluate the amount of overheating particles, i.e. those particles for which the surface temperature is higher than sintering temperature, i.e. the temperature which is slightly inferior below the melting temperature and which is representative of the temperature at which the polymer powder starts to agglomerate. For the purpose of the present description and appended claims, the sintering temperature of the polymer powder under reactor operating conditions is the temperature at which a bed of said polymer powder in contact with a gas having the same composition as the reactor recycle gas used in producing the polymer powder will sinter and form agglomerates when fluidization velocity is at maximum taking into account the fine particle entrainment limitation. The sintering temperature is decreased by decreasing the resin density, by increasing the melt index and by increasing the amount of dissolved monomers.

The particle temperature is estimated by solving heat transfer equations at the level of the particle. The fundamental mechanisms involved in that process can be divided in 2 categories: mechanisms responsible for heat generation (polymerisation reaction depending on well quantified kinetics) and equations governing heat transfer.

Heat generation is well quantified based on well known reaction kinetics and the stochastic approach allows us to describe the complexity of the fluid bed reactor using statistical dispersion of key parameters (such as partial pressure of reactants, initial concentration of active sites, level of impurities, . . . ) around their quasi-steady state average values. This process allowed us to generate a representative set of reacting particles in the reactor ($10^7$).

Heat transfer quantification is more complex to quantify due to competition between the different mechanisms involved: for each particle, heat transfer is quantified by considering local gas velocity at the level of the particle (governed mainly by particle size and position in the reactor), vaporisation of liquid at the surface of the particle (in liquid injection mode, e.g. condensation mode) and gas composition, pressure and temperature. As for heat generation, a stochastic approach is used to simulate the fluidised bed behaviour.

Figure 2:
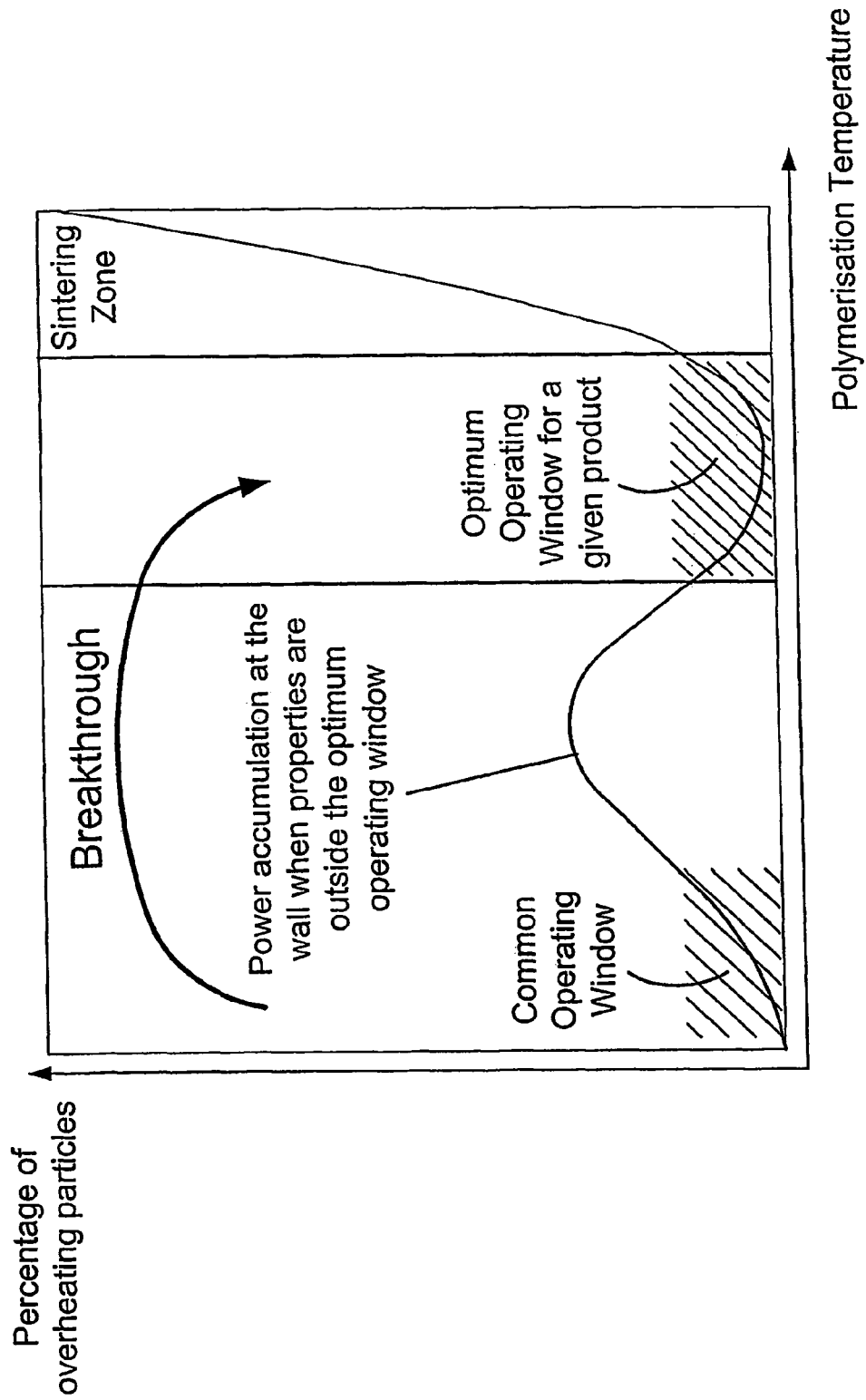
FIG. 2 is a graph that illustrates a comparison between the percentage of overheating particles and polymerisation temperature in a gas phase polymerisation process.

FIG. 2 illustrates the typical results obtained for gas phase polymerisation process wherein the mass percentage of overheating particles is given for increasing polymerisation temperature.

At very high polymerisation temperature, operation is too close to the sintering temperature of the powder, and particles massively agglomerate. Operation is highly unstable and the risk of agglomerating the entire bed is high. Operators are constantly aware of this danger and keep operation far away from the powder sintering limit, i.e. in the "common operating window".

However, the typical Overheating/Temperature curve also indicates that agglomerates can be formed at lower temperature and points out the existence of a local minimum where temperature is still high but the risk of agglomeration or sheeting is very low.

The corresponding operating window is the optimum agglomerate/sheeting-free operating window (as indicated on the right hand side of FIG. 2), which is also called the high temperature optimum operating window.

In fact, operators being aware of the risk of agglomeration at high temperatures prefer to operate with a significant safety margin at much lower temperatures than the sintering temperature. It is clear that there is a resistance in the art to increasing operating temperature through a fear of encountering powder sintering limits. However, the present invention demonstrates that it is possible by acting against this natural tendency, i.e. by increasing the operating temperature, to control advantageously the polymerisation while reducing and/or eliminating the agglomeration/sheeting risks.

It is therefore an object of the present invention to provide a process for reducing/suppressing sheeting or agglomerates during polymerisation of olefins, characterised in that the operating temperature is controlled in order to maintain the polymer particle in its high temperature optimum operating window throughout the polymerisation.

Indeed, once the man skilled in the art is aware of the existence of said optimum operating window, he is able to control his plant, and in particular the operating temperature, in such a way that the polymer particles remain in said optimum operating window.

This process is preferably applied during the fluidised bed gas phase polymerisation of olefins, especially during start-up and transition, more preferably during product grade transition.

While not wishing to be bound by the theory, the explanation for the existence of an increasing risk of sheeting/agglomeration at low temperature is related to instantaneous reacting particle properties. Indeed, temperature highly affects instantaneous particle properties (mechanical, physical and dielectric). When particle temperature is decreased (this can be done by decreasing polymerisation temperature), particles become more brittle, and surface properties are modified.

At low temperature, the generation of fines and micro-fines drastically increases. Although the fines fraction represents a low percentage in mass, it represents a considerable number of particles which are susceptible to adhere to the reactor wall due to their small size.

Conversely, when operating temperature is controlled in order to remain in the high temperature window throughout the polymerisation, it has been unexpectedly found that (micro-)fines generation could be lowered at a level where the presence of said (micro-)fines did not entrain any irreversible agglomeration phenomenon.

Figure 3:
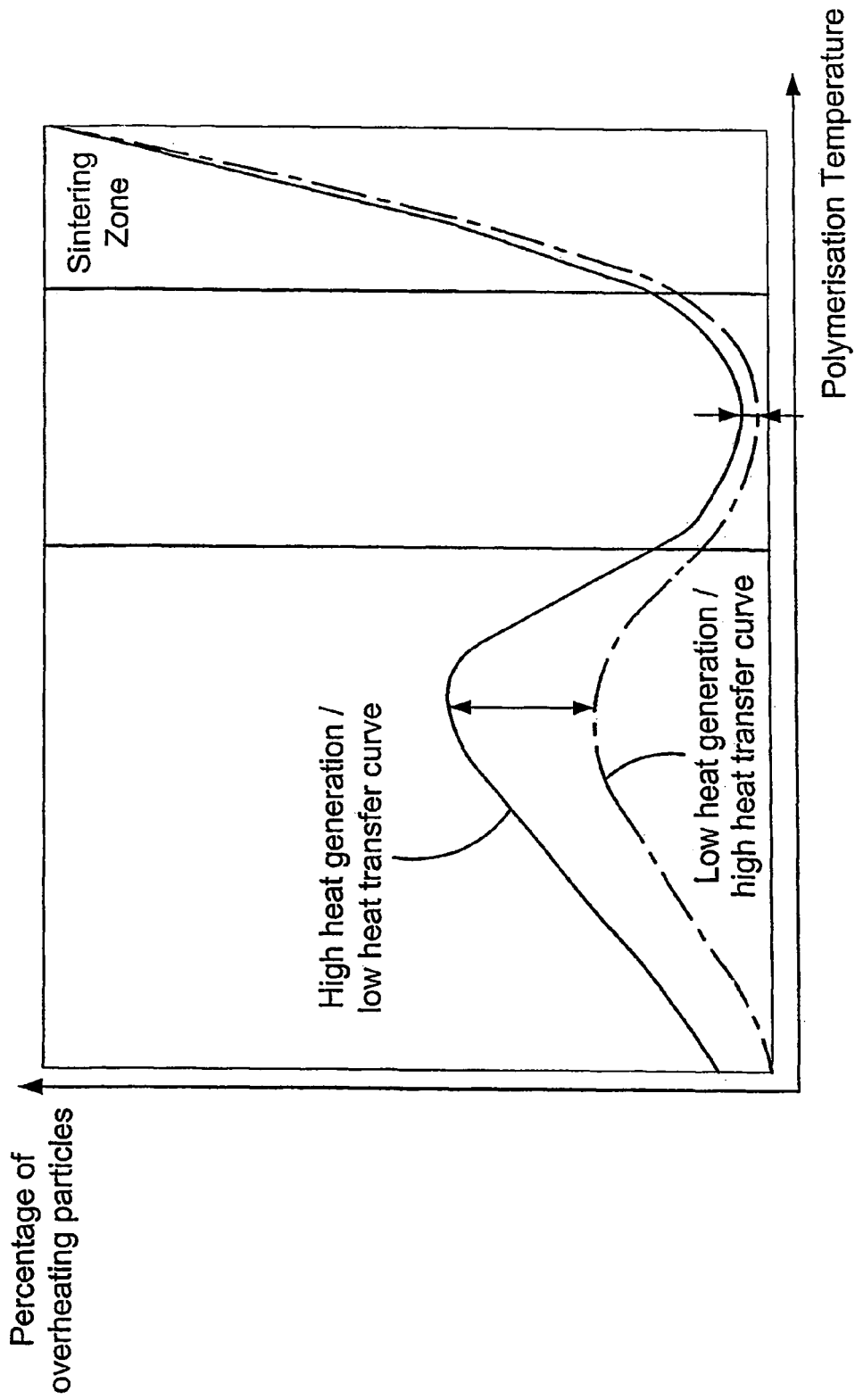
FIG. 3 is a graph similar to FIG. 2 showing two different heat transfer curves.
Figure 4:
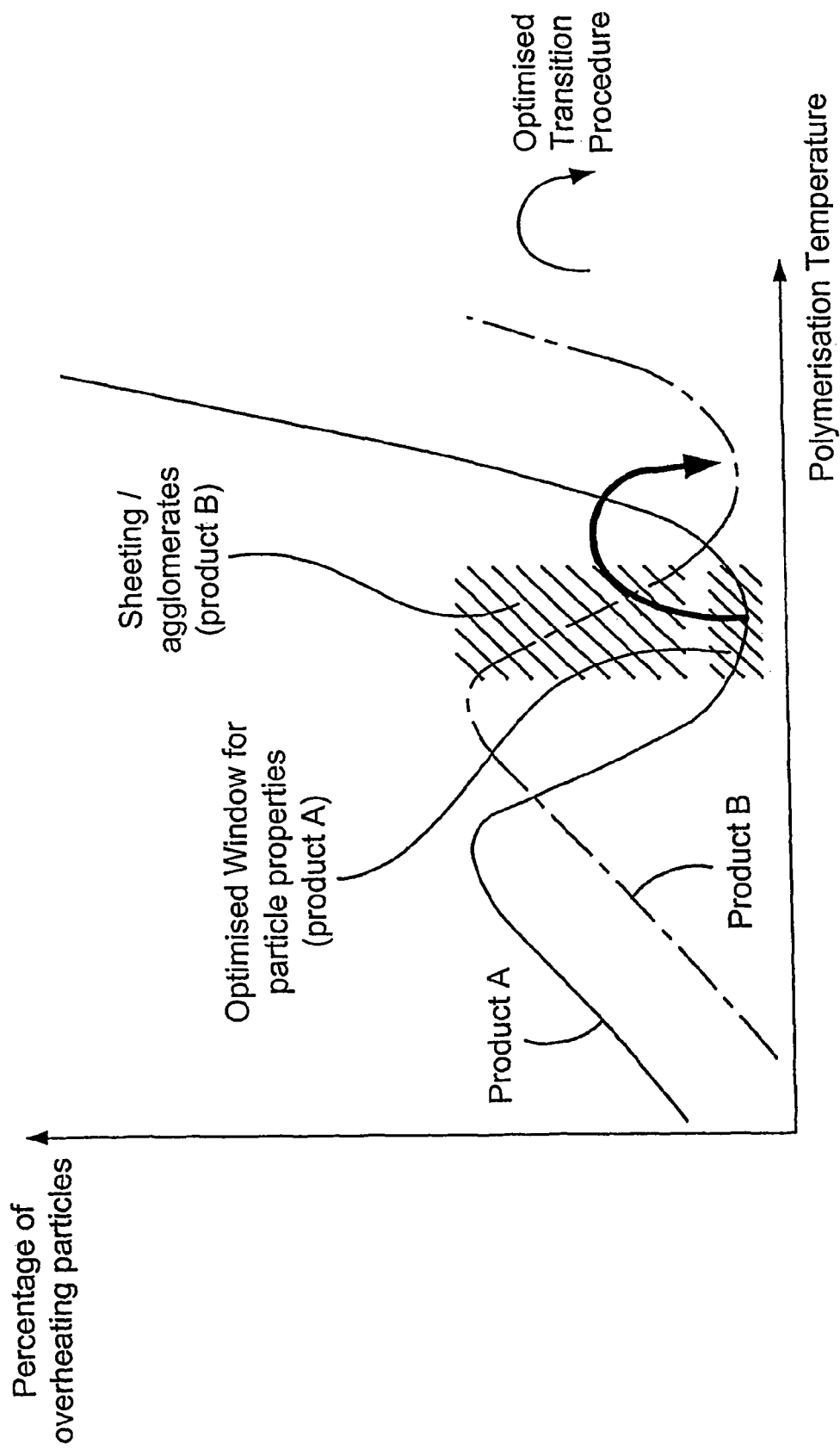
FIG. 4 is a graph similar to FIG. 2 showing the Optimum Operating Window during transitioning from one polymer to another.

The stochastic model for the fluidised bed also pointed out the simple fact that agglomerates or sheeting are formed when heat exchange is limited. When this is the case, the fraction of overheating particles is highly dependent on operating parameters such as condensation rate, fluidisation velocity, polymerisation rate (heat generated) and prepolymer or catalyst fines. On the contrary, when operating in the optimum window for particle properties, beat exchange is not limiting and the operating conditions previously mentioned do not affect the fraction of overheating particles to the same extent. In that case, plant performance can be increased by pushing catalyst productivity and production rate. (FIG. 3)

The last observation to be mentioned concerns the most commonly used operating window which is the so called "low temperature window" (left hand of FIG. 2). It corresponds to the case where operating temperature is sufficiently low so powder does accumulate at the wall but particle overheating remains controllable. This operating window can be considered as metastable. Although it is the commonly used operating window, we have found that it is non-optimised in many respects: heat exchange capacity is limited, agglomerates or sheeting can form when operating conditions are changed or production rate is increased, and most likely during grade transitions when particle properties are significantly changed.

Another object of the present invention, which is illustrated in detail in the following examples, relates to a process for reducing/suppressing sheeting or agglomerates during transition between two different polymer products made during the polymerisation of olefins, characterised in that the operating temperature is controlled in order to maintain the polymer particle in its high temperature optimum operating window throughout the transition.

In order to further analyse the corresponding phenomena, a criteria has been used to follow the changes in particle properties in real time, i.e. the instantaneous particle properties.

The particle properties regarded as important are the following: toughness, brittleness, crystallinity, conductivity, softening temperature, and sintering temperature.

Amongst the different possibilities, a combined criteria has been selected for the following reasons:

It varies with polymer crystallinity

It is a marker of polymer dielectric properties

It is derived from a mechanical property (Tensile Strength).

The general form of the criteria is the following:

$$\text{Crit}=f(\text{Property Model 1, Property Model 2,} \ldots )$$

Structure/Property Models are used to predict resin properties in-real time in order to build an on-line criteria for monitoring agglomerate/sheeting-free operating windows.

Resin properties are predicted from resin molecular structure which is relatively simple in the case of simple polymers such as polyethylene or polypropylene.

In the following description, the examples of Linear Low Density Polyethylene (LLDPE) and High Density Polyethylene (HDPE) will be covered. However, it is clear that the generality of the defined criteria is applicable to a large range of applications.

Molecular Structure for LLDPE/HDPE:

The simple molecular structure in that case can be described by the average polymer chain length, the dispersion of the chain lengths (polydispersity), the type of short chain branching (type of comonomer), the amount of short chain branching, the short chain branching distribution, and the size and amount of long chain branching.

In practice, all of this information is not necessary to predict resin properties to sufficient accuracy when the range of products being considered is limited (e.g. to certain catalyst types or even specific comonomers). A limited set of relevant parameters have in these circumstances been found to be highly sufficient. Indeed, from a Process monitoring point of view, the simplest description of resin molecular structure is highly desirable: for a given catalyst and comonomer type the first order parameters to be considered are the average polymer chain length and the amount of comonomer. Consequently, the simplest approach is to use Melt-Index (average molecular weight) and Density (amount of comonomer) to describe the changes in resin molecular structure. The Criteria "Crit" will depend on the specifics of the different comonomer types and catalysts., The main difficulty in the Structure/Properties approach is the prediction of particle properties in reacting conditions.

This problem has been solved from a process monitoring point of view by quantifying the effects of the most sensitive parameters only. These are the parameters having a great influence on particle properties in the usual range of variation in industrial operation. For instance, the criteria "Crit" will be modified in order to differentiate plant operating at high polymerisation rates. Indeed, a high polymerisation rate will affect particle properties via the particle temperature which is an important parameter for particle properties. However, the effect of this parameter being of second order, it is not mandatory to incorporate it in a more detailed model.

Example of Structure/Property Model: Particle Tensile Strength

In this example, a so called "Particle Tensile Strength" property is predicted from resin molecular structure (Melt-Index and Density in that case). It is an extrapolation of Resin Tensile Strength at polymerisation temperature.

The model has been built from measurements of Tensile Strength performed on injection moulded samples (ASTM n° D638-89). Over 150 samples have been tested covering a wide range of densities and Melt-Indexes. The comparison between predictions and measurements is given in FIG. 1 for RIGIDEX™ product types.

Such models being available, particle properties in the reactor can be monitored on-line via the prediction of Melt-Index and Density in real time. We should take the opportunity to mention here that the critical particle properties involved in the agglomeration mechanisms are the so called "instantaneous properties" which correspond to the properties of the resin formed instantaneously in the reacting conditions at a given time. The "instantaneous properties" are different from the pellet properties which correspond to a mixture of different resins formed continuously in the fluidised bed (averaging effect). The "instantaneous properties" require the use of accurate process models able to predict powder properties from operating parameters.

By taking into consideration the above, another embodiment of the present invention is to provide an effective process for reducing/suppressing sheeting or agglomerates during polymerisation of olefins, process characterised in that the above criteria "Crit" is maintained in a bounded window which corresponds to the high temperature optimised operating window.

Thus, the optimum operating window can be reached by controlling instantaneous particle properties, preferably mechanical properties, e.g. tensile strength as described hereabove.

It is therefore an object of the present invention to provide a process for reducing/suppressing sheeting or agglomerates during polymerisation of olefins, characterised in that the instantaneous properties of the growing polymer particles formed throughout the polymerisation are maintained such that there is no irreversible formation of agglomerates through generation of (micro-)fines.

It is a further object of the present invention to provide a process for reducing/suppressing sheeting or agglomerates during transition between two different polymer products made during polymerisation of olefins, characterised in that the instantaneous properties of the growing polymer particles formed throughout the transition are maintained such that there is no irreversible formation of agglomerates through generation of (micro-)fines.

Indeed, once the man in the art is aware of the existence of the high temperature optimum operating window according to the present invention, i.e. where there is no irreversible formation of agglomerates through generation of (micro-) fines, he will take automatically all necessary steps in order to maintain the instantaneous properties of the growing polymer particles in its safe optimised window.

According to a preferred embodiment of the present invention, and as explained hereabove, the instantaneous properties of the growing polymer particles are predicted by using a structure/property model.

According to another preferred embodiment of the present invention, the instantaneous properties are mechanical properties of the growing polymer.

According to a further preferred embodiment of the present invention, it is the instantaneous tensile strength of the growing polymer particles which is maintained in its safe optimised window.

Polymerisation rate and fluidisation velocity may slightly influence these criteria's.

For example, in the case of the tensile strength property criteria, for a fluidised bed polymerisation, when condensation is used, or kinetics are smoother and fluidisation velocity is higher, the operating window is wider and therefore the optimum operating window corresponds to higher values of the criteria.

At temperature close to the sintering temperature, the criteria decreases rapidly to take into account the softening of the particle and the loss of mechanical toughness (and brittleness).

One of the main advantages according to the present invention is that the man skilled in the art has now at his disposal a practical tool which allows him to determine the optimum operating window, and in particular the optimum temperature in order to avoid sheeting or agglomerates during the polymerisation of olefins, preferably during the fluidised bed gas phase polymerisation of olefins, in particular during polymer product transition.

In particular, once the man skilled in the art is able to produce one polymer grade in said optimum operating window, i.e. once he is in the position of fulfilling the above instantaneous particle property criteria's, he is also automatically able to proceed efficiently with polymer grade transitioning by keeping the said criteria at more or less the same value through the control of the operating temperature, as disclosed in the examples.

It is another embodiment of the present invention to provide for an alternative method for determining the high temperature optimum operating window of a polymer A having a density A ($d_A$), a melt index A($MI_A$) and a sintering temperature $T_{SA}$ which is produced at an operating temperature A ($T_A$) characterised in the following steps:
1. monitor sheet formation
2. if sheet are (being) formed, increase the temperature to a value $T_X$ which is equal to or higher than [$0.5*(T_A+T_{SA})$] and lower than the sintering temperature of the formed polymer minus two degrees centigrade
3. if sheets are not (being) formed, the actual polymerisation temperature becomes part of the high temperature optimum operating window of the polymer A under the existing polymerisation conditions.

Optionally, just before or just after step 2, if the sheet formation process can not be effectively controlled, proceed with a complete polymerisation stop process and restart the polymerisation at a temperature which is at least equal to $T_A$, preferably at least equal to $T_X$.

It is a further embodiment of the present invention to provide for an alternative method for determining the optimum operating window of a transition polymer AB during the transition between a polymer A ($d_A$, $MI_A$, sintering temperature $T_{SA}$, produced under temperature $T_A$) to a polymer B ($d_B$, $MI_B$, sintering temperature $T_{SB}$) wherein the said transition polymer AB ($d_{AB}$, $MI_{AB}$) is being formed characterised in the following steps:
1. monitor sheet formation
2. if $d_B > d_A$ and $MI_B < MI_A$, increase the polymerisation temperature to a value $T_{X1}$ which is equal to or higher than $[0.5*(T_A+T_{SB})]$ and lower than the sintering temperature of the formed polymer minus two degrees centigrade
3. if sheet are (being) formed, continue to increase the temperature to a value $T_{X2}$ higher than $[0.5*(T_{X1}+T_{SB})]$ and lower than the sintering temperature of the formed polymer minus two degrees centigrade
4. if sheets are not (being) formed, the actual polymerisation becomes part of the high temperature optimum operating window of the transition polymer AB under the existing polymerisation conditions.

Optionally, step 3 can be repeated by replacing $T_{X1}$ by $T_{X2}$ in the equation.

Optionally, just before or just after step 2, if the sheet formation process can not be effectively controlled, proceed with a complete polymerisation stop process and restart the polymerisation at a temperature which is at least equal to $T_{X1}$.

Once the above transitioning process has been completed and the $d_B$ $MI_B$ values of polymer B reached, i.e. when polymer B is successfully produced without sheet, then the actual polymerisation temperature becomes part of the high temperature optimum operating window of the polymer B under the existing polymerisation conditions.

It is a further embodiment of the present invention to provide for an alternative method for determining the optimum operating window of a transition polymer AB during the transition between a polymer A ($d_A$, $MI_A$, sintering temperature $T_{SA}$, which is produced at $T_A$) to a polymer B ($d_B$, $MI_B$, sintering temperature $T_{SB}$) wherein the said transition polymer AB ($d_{AB}$, $NI_{AB}$) is being formed characterised in the following steps:
1. monitor sheet formation
2. if $d_B < d_A$ and $MI_B > MI_A$, decrease the polymerisation temperature to a value $T_{X1}$ equal to or higher than $[T_{SB} - 1.2*(T_{SA}-T_A)]$ and lower than the sintering temperature of the formed polymer minus two degrees centigrade
3. if sheet are (being) formed, increase the polymerisation temperature to a value $T_{y2}$ equal to or higher than $[0.5*(T_{y1}+T_{SB})]$ and lower than the sintering temperature of the formed polymer minus two degrees centigrade
4. if sheets are not (being) formed, the actual polymerisation temperature becomes part of the high temperature optimum operating window of the transition polymer AB under the existing polymerisation conditions.

The process according to the present invention is particularly suitable for the manufacture of polymers in a continuous gas fluidised bed process. Illustrative of the polymers which can be produced in accordance with the invention are the following:
SBR (polymer of butadiene copolymerised with styrene),
ABS (polymer of acrylonitrile, butadiene and styrene),
nitrile (polymer of butadiene copolymerised with acrylonitrile),
butyl (polymer of isobutylene copolymerised with isoprene),
EPR (polymer of ethylene with propylene),
EPDM (polymer of etylene copolymerised with propylene and a diene such as
hexadiene, dicyclopentadiene or ethylidene norborene),
copolymer of ethylene and vinyltrimethoxy silane, copolymer of ethylene and one or more of acrylonitrile, maleic acid esters, vinyl acetate, acrylic and methacrylic acid esters and the like In an advantageous embodiment of this invention, the polymer is a polyolefin preferably copolymers of ethylene and/or propylene and/or butene. Preferred alpha-olefins used in combination with ethylene and/or propylene and/or butene in the process of the present invention are those having from 4 to 8 carbon atoms. However, small quantities of alpha olefins having more than 8 carbon atoms, for example 9 to 40 carbon atoms (e.g. a conjugated diene), can be employed if desired. Thus it is possible to produce copolymers of ethylene and/or propylene and/or butene with one or more $C_4$-$C_8$ alpha-olefins. The preferred alpha-olefins are but-1-ene, pent-1-ene, hex-1-ene, 4-methylpent-1-ene, oct-1-ene and butadiene. Examples of higher olefins that can be copolymerised with the primary ethylene and/or propylene monomer, or as partial replacement for the $C_4$-$C_8$ monomer are dec-1-ene and ethylidene norbornene.

According to a preferred embodiment, the process of the present invention preferably applies to the manufacture of polyolefins in the gas phase by the copolymerisation of ethylene with but-1-ene and/or hex-1-ene and/or 4 MP-1.

The process according to the present invention may be used to prepare a wide variety of polymer products for example linear low density polyethylene (LLDPE) based on copolymers of ethylene with but-1-ene, 4-methylpent-1-ene or hex-1-ene and high density polyethylene (HDPE) which can be for example copolymers of ethylene with a small portion of higher alpha olefin, for example, but-1-ene, pent-1-ene, hex-1-ene or 4-methylpent-1-ene.

When liquid condenses out of the recycle gaseous stream, it can be a condensable monomer, e.g. but-1-ene, hex-1-ene, 4-methylpent-1-ene or octene used as a comonomer, and/or an optional inert condensable liquid, e.g. inert hydrocarbon (s), such as $C_4$-$C_8$ alkane(s) or cycloalkane(s), particularly butane, pentane or hexane.

The process is particularly suitable for polymerising olefins at an absolute pressure of between 0.5 and 6 MPa and at a temperature of between 30° C. and 130° C. For example for LLDPE production the temperature is suitably in the range 75-110° C. and for HDPE the temperature is typically 80-125° C. depending on the activity of the catalyst used and the polymer properties desired.

The polymerisation is preferably carried out continuously in a vertical fluidised bed reactor according to techniques known in themselves and in equipment such as that described in European patent application EP-0 855 411, French Patent No. 2,207,145 or French Patent No. 2,335,526. The process of the invention is particularly well suited to industrial-scale reactors of very large size.

The polymerisation reaction may be carried out in the presence of a catalyst system of the Ziegler-Natta type, consisting of a solid catalyst essentially comprising a compound of a transition metal and of a cocatalyst comprising an organic compound of a metal (i.e. an organometallic compound, for example an alkylaluminium compound). High-activity catalyst systems have already been known for a number of years and are capable of producing large quantities of polymer in a relatively short time, and thus make it possible to avoid a step of removing catalyst residues from the polymer. These high-activity catalyst systems generally comprise a solid catalyst consisting essentially of atoms of transition metal, of magnesium and of halogen. The process is also suitable for use with Ziegler catalysts supported on silica. The process is also especially suitable for use with metallocene catalysts in view of the particular affinity and reactivity experienced with comonomers and hydrogen. The process can also be advantageously applied with a late transition metal catalyst, i.e. a metal from Groups VIIIb or Ib (Groups 8-11) of the Periodic Table. In particular the metals Fe, Co, Ni, Ru, Rh, Pd, Os, Ir, and Pt are preferred, especially Fe, Co and Ni. The late transition metal complex may comprise bidentate or tridentate ligands, preferably coordinated to the metal through nitrogen atoms. As examples are those complexes disclosed in WO96/23010. Suitable iron and/or cobalt complexes catalysts can also be found in WO98/27124 or in WO99/12981.

It is also possible to use a high-activity catalyst consisting essentially of a chromium oxide activated by a heat treatment and associated with a granular support based on a refractory oxide.

The catalyst may suitably be employed in the form of a prepolymer powder prepared beforehand during a pre-polyymerisation stage with the aid of a catalyst as described above. The prepolymerisation may be carried out by any suitable process, for example, polymerisation in a liquid hydrocarbon diluent or in the gas phase using a batch process, a semi-continuous process or a continuous process.

The following examples illustrate the present invention.

EXAMPLES

The following examples were conducted in a conventional fluidised bed reactor. The catalyst used was a Ziegler type, titanium based catalyst (supported or pre-polymerised). The products made in the examples were copolymers of ethylene and butene, and ethylene and 4-methyl-pentene-1. Hydrogen was used as a chain transfer agent to control the melt-index of the polymer.

The following examples are illustrations of the monitoring of sheeting/agglomerate-free operating window. They correspond to a bounded window for instantaneous reacting particle properties. The most sensitive parameter to adjust reacting particle properties for a given product is operating temperature (final pellet Melt-Index and Density being set for each product type).

The following examples will illustrate the use of operating temperature as a means to control reacting particle properties. The first example is an illustration of operating conditions moving out of the optimised particle properties window. It is a comparative example which illustrates the irreversible formation of sheets/agglomerates through generation of (micro-)fines at the reactor wall when particle properties are outside the optimum operating window.

The second example is an illustration of the optimum control of particle properties to avoid sheeting and agglomerates. This example is a product transition similar to the case of example 1. In this second case, temperature is adjusted to compensate for final resin property changes. This second example is an illustration of continuous operation in the sheeting/agglomerates-free operating window.

The third example is taken from WO99/02573. It is similar to the second example in terms of particle properties and final resin properties. This example is an illustration of particle properties moving outside the optimum window during grade transitioning. In this example, the meta-stable window has been chosen: the powder accumulation problem is not solved but polymerisation temperature is decreased such that the layer of powder at the wall does not melt.

Comparative Example 1

Particle properties moving outside the optimum window during grade transitioning.

A fluidised bed reactor was transitioned from a 0.926 density, 0.6 melt index ethylene/4-methyl-pentene-1 copolymer to a 0.935 density, 0.5 melt index ethylene/4-methyl-pentene-1 copolymer. The prepolymer (Ziegler titanium based catalyst) was the same for both products. The bed temperature was slightly decreased from 86° C. to 83° C. during transition to the higher density product.

The transition was smooth but as the 0.926 density, 0.6 Melt-Index material was replaced by the 0.935, 0.9 Melt-Index resin, wall temperature started to peak in the lower part of the reactor as a consequence of the formation of a fused layer of powder at the wall. Later on agglomerates started to block withdrawal lines.

In this case the tensile strength criteria is used to monitor instantaneous reacting particle properties: the first product operating conditions correspond to particle properties in the optimum operating window (no sheeting nor agglomerates). During grade transitioning, the criteria started to increase from 5.6 to 6.5 which is outside the optimum window. The polymer instantaneously formed in the reactor became too brittle and fines and micro-fines started to form. Powder then accumulated at wall leading to overheating as it was observed on skin temperature probes and sheeting.

This typical problem of particle properties above the upper limit of the optimum window has been permanently solved by sufficiently increasing polymerisation temperature (in this case 95° C. so the criteria equals 5.6) as it is illustrated in the following example.

Example 2

Particle properties are maintained in the optimum operating window during grade transitioning.

A fluidised bed reactor was transitioned from a 0.919 density, 0.9 melt index ethylene/butene copolymer to a 0.926 density, 0.75 melt index ethylene/butene copolymer. The prepolymer (Ziegler titanium based catalyst) was the same as the one used in comparative example 1. The bed temperature was increased from 86° C. to 96° C. during transition to the higher density product with a rate such that the tensile strength criteria is maintained at 5.6.

Polymerisation temperature is increased to maintain particle properties in the optimum window: not too close to sintering and not too brittle/crystalline. For comparison, if polymerisation temperature had been maintained at 86° C. during transition, the criteria would have reached 6.7 indicating that particle properties were far above the upper limit of the optimum window (similar to example 1).

With such a transition procedure, particle properties remain in the optimum window: no agglomerates/sheeting occurred and skin temperature probes remained at their baseline indicating that the reactor walls were clean.

Comparative Example 3

Particle properties are moving outside the optimum window during grade transitioning.

This example is taken from WO99/02573: the case is comparable to the previous example which has been chosen for comparison.

A fluidised bed reactor was transitioned from a 0.917 density (instead of 0.919 for example 2), 1.0 melt index (instead of 0.9 for example 2) ethylene/hexene copolymer to a 0.925 density (instead of 0.926 for example 2), 0.5 melt index (instead of 0.75 for example 2) ethylene/hexene copolymer. The catalyst (Ziegler titanium-based) was the same for both products. The bed temperature was increased from 86° C. to 91° C. during the transition to the higher density product.

We have used the same tensile strength criteria to monitor instantaneous particle property changes during the transition: the first product is made at 86° C. which corresponds to a criteria of 5.5. This product is therefore in its optimum operating window thus explaining that neither sheeting nor agglomerates have been experienced in this case. For the second product, the criteria reaches 6.2 which is outside the optimum window for particle properties. In fact, the value of 5.6 would require us to operate at 97° C. (comparable to the similar case reported in the previous example). At 91° C., particle properties are too brittle and crystalline leading to the formation of a layer of powder at the wall. Unfortunately at 91° C., the temperature is high enough so the layer of powder can fuse and sheets start to form. Lowering operating temperature prevents the fusion of the layer but does not solve the problem of inadapted particle properties.

The change of particle surface properties is probably the reason for the increase of static level during transition: when the film starts to form, additional static is generated, and lowering operating temperature only stops this phenomena without solving the problem of particle properties: metastable operating conditions are reached with all the limitations we have described earlier: heat transfer capacity, and high sensitivity to operating parameters such as condensation, fluidisation velocity, polymerisation rate, and production rate regarding sheeting/agglomerates problem.

This last example is an excellent illustration of the use of the particle properties criteria to monitor the sheeting and agglomerates free operating window. It underlines that the finding of this window is a breakthrough which was not obvious for the "Man of the Art" as it requires to move counter to the prejudice of operating closer to powder sintering temperature. The criteria used to determine the optimum operating window has proved to be extremely powerful as it also determines the position of the optimum window not only for steady-state operation but at any time during transitions and start-ups as well.

Example 4

The catalyst used was 2,6-diacetylpyridinebis(2,4,6-trimethylanil)$FeCl_2$ activated with methylaluminoxane (MAO) and supported on silica (Crosfield grade ES70X). The preparation of this catalyst is described in detail in WO 99/46304, the content of which is incorporated herein by reference.

The polymerization was carried out in a conventional fluidized bed gas phase polymerization reactor. The catalyst injection rate was set such as to maintain the production rate constant at the desired level. During the production of an ethylene polymer at a polymerization temperature of 90° C., cold bands on the reactor wall were observed; the polymerization temperature was consequently increased to 96° C. and, within a short period of time, disappearance of cold bands could be observed which is synonymous of having reached the optimum operating window.

The invention claimed is:

1. A method for reducing the formation of agglomerates during the transition between two different grades of polyolefin copolymer products being made during the polymerization thereof, which method includes the steps of: copolymerizing two or more polyolefins in a fluidized bed gas phase reactor in the presence of a suitable catalyst and under a polymerization temperature $T_A$ that forms a polyolefin copolymer A having a density $d_A$, a melt index $MI_A$ and a sintering temperature $T_{SA}$; and transitioning polyolefin copolymer A to a polyolefin copolymer B having a density $d_B$, a melt index $MI_B$ and a sintering temperature $T_{SB}$, where $d_B > d_A$ and $MI_B \leq MI_A$, via a transition polyolefin copolymer AB having a density $d_{AB}$ and a melt index $MI_{AB}$, by increasing the polymerization temperature in the reactor to a temperature $T_{x1}$ which is equal to or higher than $0.5 \times (T_A + T_{SB})$ and lower than the sintering temperature $T_{SB}$ of the polyolefin copolymer B minus 2° C. until polyolefin copolymer B is continuously being produced without or with a substantially reduced amount of agglomerate formation.

2. The method of claim 1, wherein the polyolefin copolymer products are copolymers of ethylene and/or propylene and/or butene with or without other alpha olefins having from 4 to 8 carbon atoms.

3. The method of claim 2, wherein the polyolefin copolymer products are copolymers of ethylene and butene or of ethylene and 4-methyl-pentene-1.

4. The method of claim 1, wherein the reactor is a continuous fluidized bed gas phase reactor.

* * * * *

UNITED STATES PATENT AND TRADEMARK OFFICE
CERTIFICATE OF CORRECTION

| | | |
|---|---|---|
| PATENT NO. | : 7,812,103 B2 | Page 1 of 1 |
| APPLICATION NO. | : 11/014901 | |
| DATED | : October 12, 2010 | |
| INVENTOR(S) | : Jean-Richard Llinas et al. | |

It is certified that error appears in the above-identified patent and that said Letters Patent is hereby corrected as shown below:

Title page Item "[63] Related U.S. Application Data", left hand column please insert --Continuation of Application No. 10/220,040, filed November 19, 2002, which is a 371 of PCT/GB01/0092 filed March 2, 2001.--

Signed and Sealed this
Fifth Day of July, 2011

David J. Kappos
*Director of the United States Patent and Trademark Office*